Patented Dec. 5, 1944

2,364,089

UNITED STATES PATENT OFFICE 2,364,089

CYCLIZED RUBBER-UNSATURATED CARBONYL COMPOUND REACTION PRODUCTS

James A. Mitchell, Kenmore, N. Y., assignor to E. I. du Pont de Nemours & Company, Wilmington, Del., a corporation of Delaware No Drawing. Application May 20, 1941, Serial No. 394,306

9 Claims. (Cl. 260—734)

This invention relates to moisture-resistant sheet wrapping material, especially transparent moistureproofed, non-fibrous web. More particularly it appertains to non-tacky, heat-sealable, age-resistant moistureproofing coatings on films of regenerated cellulose and the like.

One of the newer products in the sheet wrapping material field consists of a regenerated cellulose film having a moistureproofing coating. The manufacture of such a film (foil, pellicle, sheet, skin, tissue, web) is described in U. S. A. Patent 1,548,864 (Brandenberger). Representative coatings and modes for their preparation and application are set out in U. S. A. Patents 1,737,187 (Charch and Prindle), 1,826,697-8 (Charch and Craigue), 2,042,589 (Charch and Hershberger), 2,147,180 (Ubben), 2,159,151 (Hershberger), and 2,201,747 (Staudt).

The coating is usually a continuous, unbroken layer comprising essentially moistureproofing material (material which does not dissolve more than an infinitesimal amount of, if any water), for example, a waxy (wax-like) substance such as paraffin wax, a cementing (binding, film-forming) material therefor, for example, cellulose nitrate. Generally the base film contains softening material, for example, glycerol, and the coating contains plasticizing material, for example, dibutyl phthalate, to promote flexibility. To overcome any haziness which might result from some proportions and combinations of other components of the coating, transparentizing (blending, homogenizing) material, for example, resins and gums such as dammar and ester gum, is ordinarily included.

Rubber, a polymer-like material composed of units having the formula:

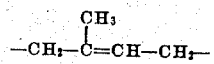

can be cyclized (or isomerized) in various ways to form a product having the same empirical formula, but which appears to have a structural unit derived from four of the original units corresponding to the formula:

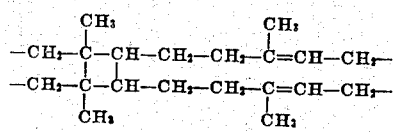

as indicated in J. I. E. C. (1941) XXXIII 389 et seq. Surprisingly, it has now been found that this material can be reacted with maleic anhydride and related carbonyl compounds containing the grouping —CO—C=C— (for example, itaconic acid). The resulting resinous materials can be used very satisfactorily in the preparation of moistureproofing coatings.

It was an object of this invention to provide improved coating compositions. Other objects were to produce improved moistureproofing coating compositions, improved moistureproofing coatings and improved moistureproof sheet wrapping material. Further objects were to produce improved moisture-resistant, non-fibrous pellicles, to produce satisfactory coating compositions comprising cyclized rubber derivatives, to produce coating compositions which would adhere firmly to a flexible base sheet even when subjected to moisture and/or water for long periods of time, to produce cyclized rubber derivative compositions which would be stable over long periods of time, to produce coating compositions exhibiting high stability, to produce moisture-resistant coating compositions comprising cyclized rubber derivatives, moistureproofing agents and conventional constituents, to provide transparent, non-fibrous, moistureproof, regenerated cellulose and like sheet wrapping materials comprising stable cyclized rubber derivative compositions, to produce coating compositions which give adhesive bonds of strength satisfactory for laminating thin, flexible, non-fibrous sheet materials, to produce coating compositions which would remain stable when exposed to high temperatures, heat, and the like for long periods of time, and to produce coating compositions which would give adhesive bonds of good strength on the application of heat and pressure. A general advance in the art, and other objects which will appear hereinafter, are also contemplated.

It has now been found that compositions prepared from carbonyl compound derivatives from cyclized rubber, for example, moistureproofing coatings, remain anchored to non-fibrous base films for long periods of time, have excellent heat sealability, give adhesive bonds which are initially very good and remain so for long periods of time, and are stable and transparent after long exposure to light, high temperatures, etc.

How the foregoing objects and related ends are accomplished will be apparent from the following exposition, in which are disclosed the principle and divers embodiments of the invention, including the best mode contemplated for carrying out the same. Parts are given by weight unless otherwise specified.

Example I

Prepare a 450 gauge web of regenerated cellulose in the manner described in U. S. A. Patent No. 1,548,864 (Brandenberger), that is, by casting viscose, coagulating, regenerating, desulfuring, bleaching, washing free from impurities, softening and drying. Use an aqueous bath containing 4.33% glycerol for softening, use rollers heated to 60°–90° C. for drying, and bring the dried sheet to normal humidity.

Heat a solution of:

| | Parts |
|---|---|
| Pliolite[1] (milled; deformation point 30° C.) | 25.0 |
| Cinnamic acid | 3.0 |
| Benzoyl peroxide | 0.25 |
| Toluene | 225.0 |

[1] Pliolite is a thermoplastic rubber derivative made by condensing (isomerizing, cyclizing) rubber with a catalyst of the tin tetrachloride type (see "Paper Trade Journal," page 96, February 23, 1939, J. I. E. C. XIX 1033, XXVI 125, XXXIII 389, and U. S. A. Patents Nos. 1,797,188, 1,846,247, 1,853,334 and 2,052,391). The chemical structure is described in "Rubber Age," April 1939.

under a reflux condenser at approximately 115° C. for five hours, and then incorporate 2.5 parts of paraffin wax (M. P. 60° C.).

Coat the regenerated cellulose web with the resulting composition. Carry out the coating of the web by passing it continuously through a bath of the aforementioned solution maintained at 35° C. Remove the excess coating material by scraping with doctor knives, and dry the coated web (remove the volatile solvent) at a temperature slightly above the melting point of the wax.

Employ enough of the moistureproofing coating composition so that the final product will have an amount proportional to two pounds for each 3,000 square feet of web surface (this quantity to include the coating on both sides of the web).

The resulting product will be moistureproof (have a permeability value of 25), heat sealable (have a heat sealing value of 240), transparent, flexible, colorless and quite non-tacky. The coating will show no loss in adhesion and heat sealing characteristics after several weeks' exposure at 95° F. (35° C.).

A product prepared in exactly the same manner, but omitting the refluxing step in the preparation of the moistureproofing coating composition, will be completely degraded in one week.

*Example II*

Prepare a moistureproofing coating composition by heating:

| | Parts |
|---|---|
| Pliolite (milled; deformation point 30° C.) | 25.0 |
| Itaconic acid | 2.5 |
| Benzoyl peroxide | 0.25 |
| Toluene | 225.0 | under refluxing conditions at about 115° C. for 4 hours, and then adding 2.5 parts of paraffin wax (M. P. 60° C.). Coat regenerated cellulose web with this composition in the manner described in Example I. The coating will show no loss in adhesion and heat sealing characteristics after several weeks' exposure at 95° F. (35° C.). It will have a permeability value of 10, a heat sealing value of 200, and be transparent and flexible.

*Example III*

Prepare a moistureproofing coating composition by dissolving 2.5 parts of paraffin wax (M. P. 60° C.) in a solution prepared by heating:

| | Parts |
|---|---|
| Pliolite (milled; deformation point 30° C.) | 25.0 |
| Citraconic anhydride | 2.0 |
| Benzoyl peroxide | 0.25 |
| Toluene | 225.0 | at 115° C. for 4 hours under a reflux condenser. Coat regenerated cellulose web with this composition in the manner described in Example I. The coating will show no loss in adhesion and heat sealing characteristics after several weeks' exposure at 95° F. (35° C.). It will be transparent, moistureproof, flexible, and have a permeability value of 10 and a heat seal value of 150.

*Example IV*

Prepare a moistureproofing coating composition by dissolving 2.5 parts of paraffin wax (M. P. 60° C.) in a solution prepared by heating:

| | Parts |
|---|---|
| Pliolite (milled; deformation point 30° C.) | 25.0 |
| Crotonic acid | 3.0 |
| Benzoyl peroxide | 0.25 |
| Toluene | 225.0 | at 115° C. for 4 hours under a reflux condenser.

Coat regenerated cellulose web with this composition in the manner described in Example I. The coating will show no loss in adhesion and heat sealing characteristics after several weeks' exposure at 95° F. (35° C.). It will be transparent, moistureproof, flexible, and have a permeability value of 10 and a heat seal value of 140.

*Example V*

Prepare a coating composition by heating under refluxing conditions for 4 hours at 115° C., a solution consisting of:

| | Parts |
|---|---|
| Pliolite (milled; deformation point 30° C.) | 25.0 |
| Cinnamic acid | 3.0 |
| Benzoyl peroxide | 0.25 |
| Toluene | 225.0 |

Coat regenerated cellulose web with this composition in the manner described in Example I. It will have a permeability value of 500, a heat sealing value of 80, and be transparent and flexible. A loss in adhesion and heat sealing properties will be considerably less than that in a product obtained in an identical manner but omitting the heating under reflux, in other words, the reaction between the unsaturated acid material and the cyclized rubber gives a product which retains its original characteristics much longer than would a mixture of the unreacted products.

*Example VI*

Heat a mixture of:

| | Parts |
|---|---|
| Pliolite (milled; deformation point 30° C.) | 20.0 |
| Maleic anhydride | 2.0 |
| Lauroyl peroxide | 0.4 |
| Toluene | 180.0 |
| Paraffin wax (M. P. 60° C.) | 2.0 | at 110°–115° C. for six hours and coat regenerated cellulose web with the resulting solution in the manner described in Example I. The resulting product will be moistureproof (have a permeability value of 8), and have good heat sealing properties (heat seal value 125). It will show no degradation in heat sealing properties, adhesion and anchorage after two weeks' free exposure at 95° F. (35° C.).

*Example VII*

Heat a mixture of:

| | Parts |
|---|---|
| Pliolite (milled; deformation point 30° C.) | 20.0 |
| Maleic anhydride | 2.0 |
| Benzoyl peroxide | 0.1 |
| Toluene | 180.0 |
| Paraffin wax (M. P. 60° C.) | 2.0 | at 110°–120° C. for four hours, and coat regenerated cellulose web with the resulting solution in the manner described in Example I. The resulting product will retain its adhesion and heat sealing properties after four weeks' exposure at 95° F. (35° C.). It will have a permeability value of 7 and a heat seal value of 130.

Example VIII

Heat a mixture of:

| | Parts |
|---|---|
| Pliolite (milled; deformation point 30° C.) | 20.0 |
| Maleic anhydride | 2.0 |
| Toluene | 180.0 |
| Paraffin wax (M. P. 60° C.) | 2.0 | at 110°–120° C. for four hours, and coat regenerated cellulose web with the resulting solution in the manner described in Example I. The resulting product will retain its adhesion and heat sealing properties after three weeks' exposure at 35° C. It will have a permeability value of 25 and a heat seal value of 130.

Example IX

Heat a mixture of:

| | Parts |
|---|---|
| Pliolite (milled; deformation point 30° C.) | 20.0 |
| Maleic anhydride | 2.0 |
| Paratoluene sulfonic acid | 0.4 |
| Toluene | 180.0 |
| Paraffin wax (M. P. 60° C.) | 2.0 | at 110°–120° C. for four hours, and coat regenerated cellulose web with the resulting solution in the manner described in Example I. The resulting product will retain its adhesion and heat sealing properties after three weeks' exposure at 35° C. It will have a permeability value of 70 and a heat seal value of 110.

Example X

Heat a mixture of:

| | Parts |
|---|---|
| Pliolite (milled; deformation point 30° C.) | 20.0 |
| Maleic anhydride | 1.0 |
| Benzoyl peroxide | 0.2 |
| Toluene | 180.0 |
| Paraffin wax (M. P. 60° C.) | 2.0 | at 110°–120° C. for four hours, and coat organic solvent soluble cellulose acetate sheet wrapping material with the resulting solution in the manner described in Example I. The resulting product will retain its adhesion and heat sealing properties after three weeks' exposure at 35° C. It will have a permeability value of 8 and a heat seal value of 145.

Example XI

Heat a mixture of:

| | Parts |
|---|---|
| Pliolite (milled, deformation point 30° C.) | 20.0 |
| Maleic anhydride | 1.0 |
| Benzoyl peroxide | 0.2 |
| Toluene | 180.0 |
| Paraffin wax (M. P. 60° C.) | 2.0 | at 110°–120° C. for five hours, and coat regenerated cellulose film with the resulting solution in the manner described in Example I. The resulting product will retain good adhesion, moistureproofness, anchorage and heat sealing properties after three weeks' exposure at 35° C. It will have a permeability value of 5 and a heat seal value of 160.

Example XII

Heat a mixture of:

| | Parts |
|---|---|
| Marbon B [1] (softening point 75°–85° C.) | 20.0 |
| Maleic anhydride | 1.0 |
| Benzoyl peroxide | 0.2 |
| Toluene | 180.0 |
| Paraffin wax (M. P. 60° C.) | 2.0 |

[1] A chlorine-free cyclized rubber corresponding in properties to Pliolite.

at 110°–120 C. for five hours, and coat regenerated cellulose film with the resulting solution in the manner described in Example I. The resulting product will retain good adhesion, moistureproofness, anchorage and heat sealing properties after six weeks' exposure at 35° C. It will have a permeability value of 5 and a heat seal value of 500.

A product prepared in the same manner but without reacting the cyclized rubber and the maleic anhydride, showed a rapid degradation during the same time.

Example XIII

Reflux a solution of:

| | Parts |
|---|---|
| Pliolite (deformation point 65° C.) | 40.0 |
| Maleic anhydride | 2.0 |
| Benzoyl peroxide | 0.4 |
| Toluene | 200.0 | for five hours at a temperature of 110°–115° C., and isolate the resulting solid product. The isolation may be accomplished in various ways, for example, by evaporating off the solvents under vacuum or by precipitating by pouring the toluene solution into alcohol with stirring, followed by washing with water and drying.

The resulting product, when dissolved in a suitable solvent such as toluene, benzene or naphtha, and coated on regenerated cellulose sheet, will show good adhesion and heat sealing properties, and retain these properties for a considerably longer time than coatings of the same Pliolite unmodified by treatment with maleic anhydride and similarly coated from a solution.

Similar properties are obtained when the coating is applied to paper, lacquer coated paper, wood, lacquer coated wood, lacquer coated metal, and cellulose acetate. Such coatings will be of the moistureproof type if wax is dissolved in the solution before it is used for coating.

Example XIV

Heat a mixture of:

| | Parts |
|---|---|
| Pliolite (milled; deformation point 30° C.) | 20.0 |
| Maleic anhydride | 1.0 |
| Benzoyl peroxide | 0.2 |
| Toluene | 180.0 |
| Hydrogenated methyl abietate | 2.0 |
| Paraffin wax (M. P. 60° C.) | 2.0 | at 110°–120° C. for four hours, and coat organic solvent soluble cellulose acetate sheet wrapping material with the resulting solution in the manner described in Example I. The resulting product will retain its adhesion and heat sealing properties after three weeks' exposure at 35° C. It will have a permeability value of 8 and a heat seal value of 145.

Example XV

Heat a mixture of:

| | Parts |
|---|---|
| Pliolite (milled; deformation point 30° C.) | 25.0 |
| Cinnamic acid | 3.0 |
| Benzoyl peroxide | 0.25 |
| Chlorinated paraffin wax (40% chlorine) | 1.0 |
| Toluene | 225.0 | under a reflux condenser at approximately 115° C. for 5 hours and then incorporate in the resultant 2.5 parts of paraffin wax (M. P. 60° C.), and coat regenerated cellulose film with the resulting solution in the manner described in Example I. The resulting product will be moistureproof, heat sealable, transparent, flexible, non-tacky, colorless, and have good slip, a permeability value of 25 and a heat sealing value of 240.

Example XVI

Prepare a moistureproofing coating composition by dissolving 2.5 parts of paraffin wax (M. P. 60° C.) and 2 parts of ester gum, in a solution prepared by heating:

| | Parts |
|---|---|
| Pliolite (milled; deformation point 30° C.) | 25.0 |
| Citraconic anhydride | 2.0 |
| Benzoyl peroxide | 0.25 |
| Toluene | 225.0 | at 115° C. for 4 hours under a reflux condenser.

Coat regenerated cellulose web with this composition in the manner described in Example I. The coating will show no loss in adhesion and heat sealing characteristics after several weeks' exposure at 95° F. (35° C.). It will be transparent, moistureproof, flexible, and have a permeability value of 10 and a heat seal value of 150.

Example XVII

Prepare a moistureproofing coating composition by dissolving 2.5 parts of paraffin wax (M. P. 60° C.) and 2 parts of coumarone-indene resin in a solution prepared by heating:

| | Parts |
|---|---|
| Pliolite (milled; deformation point 30° C.) | 25.0 |
| Crotonic acid | 3.0 |
| Benzoyl peroxide | 0.25 |
| Toluene | 225.0 | at 115° C. for 4 hours under a reflux condenser.

Coat regenerated cellulose web with this composition in the manner described in Example I. The coating will show no loss in adhesion and heat sealing characteristics after several weeks' exposure at 95° F. (35° C.). It will be transparent, moistureproof, flexible, and have a permeability value of 10 and a heat seal value of 140.

Example XVIII

Use a composition consisting of:

| | Parts |
|---|---|
| Isomerized rubber (M. P. 65° C.)-maleic acid product (of Ex. XIII) | 10 |
| Polybutene[1] (molecular wt. 7,000) | 30 |
| Paraffin wax (M. P. 60° C.) | 25 |
| Toluene | 100 |

[1] J. I. E. C. XXXII 299, 731.

to adhere two sheets of plain, transparent, regenerated cellulose film. The laminated product will be transparent and moistureproof.

Example XIX

Use a composition consisting of:

| | Parts |
|---|---|
| Isomerized rubber (M. P. 65° C.)-maleic acid product (of Ex. XIII) | 50 |
| Hydrogenated methyl abietate | 30 |
| Paraffin wax (M. P. 60° C.) | 20 | to adhere two sheets of plain, transparent, regenerated film. The laminated product will be transparent and moistureproof.

The cyclized rubber-unsaturated carboxylic acid condensation (reaction product) is new. In its preparation, cyclized rubbers of various deformation points (temperatures at which flow can be induced, not melting points as the expression "softening point" migh indicate), may be employed. One or more may be used. The deformation points of cyclized rubber fall within the range 35°–105° C. Material deforming below 65° C. is preferred, since is gives the most satisfactory results. Marbon B is available with deformation points of 50°–75° C.

The carbonyl compounds condensed with the cyclized rubber are hydrocarbon carboxylic acids and anhydrides. The carbonyl group may be attached to saturated or unsaturated carbon atoms, that is to say, carbonyl compounds may be aliphatic, alicyclic or aryl. They may be mono- or polybasic. The preferred acids are arcrylic, crotonic, methacrylic, cinnamic, maleic and itaconic. The corresponding acid anhydrides, as just indicated, can also be used, for example, maleic anhydride, citraconic anhydride, etc. Compounds decomposing to these acids and their anhydrides as a result of the heating which takes place during the reaction, for example malic acid (yielding maleic acid), citric acid (yielding itaconic acid and citraconic acid anhydride), etc., can also be used, and being equivalents, are considered within the scope of this invention and the terminology used to describe it.

The condensation is preferably carried out in a solvent. Various organic liquids such as aromatic hydrocarbons (benzene, toluene, xylene, etc.), naphtha solvents and chlorinated hydrocarbons, are suitable. In the absence of solvents, suitable mixtures of the ingredients may be employed. The reaction may be carried out under various conditions of temperature and pressure, for example, refluxing at atmospheric pressure with a solvent, or at higher temperatures and pressures in an autoclave. A reaction temperature above 100° C., preferably in the range 100°–110° C., is preferred, but the wider range of 60°–150° C. gives usable products.

The reaction should be complete after 4 hours' heating at 110° C. A product heated for only 2 hours at 100°–110° C. can be used to advantage. Naturally the time of reaction varies with the temperature and the efficiency of the catalyst. Catalysts other than those mentioned in the specific examples, for example, hydrogen peroxide, may be employed, or if the particular circumstances involved do not interfere with a relatively longer reaction period, the condensation may be carried out in the absence of a catalyst.

No advantage has been found in using more than 15% maleic anhydride (or equivalent quantities of other carbonyl compounds) based on the combined weight of the reactants. A definite improvement results with quantities as low as 0.1% maleic anhydride, so these figures may be taken as the maxima and minima of the preferred range of proportions.

As the moistureproofing agent, any wax (used generically to include waxy substances like paraffin wax, as well as true waxes which are monohydric alcohol esters of higher fatty acids) or mixture of waxes, may be employed. Ordinarily paraffin wax melting above 50° C., or better, that melting at 60° C. (and above), is preferred.

The incorporation of wax in compositions containing the new cyclized rubber derivative leads to moisture resistance. Ordinarily 3% to 15% wax, based on the solids of the moistureproofing coating composition, is employed. Noticeable improvement is obtainable with even smaller amounts. The wax may be added either before or after the cyclized rubber is reacted with the carbonyl compound.

The properties of the new cyclized rubber derivative compositions may be enhanced and modified in known ways, by the incorporation of minor proportions of other materials. Details of the conventional modifying practices such as dyeing, pigmenting, plasticizing (or softening), transparentizing, and like procedures and materials used therein, are well known and are disclosed in the patents listed elsewhere herein. Reference is made thereto for specific details. Beneficial results are frequently brought about by incorporating natural and/or synthetic resins.

Organic solvent soluble amino polymers (basic amino nitrogen-containing polymers) of the type disclosed in U. S. A. Patent No. 2,190,776 (Ellingboe and Salzberg) may be added to the composition for further or specialized protection. These materials are also soluble in 2% aqueous acetic acid. Anti-oxidants and other stabilizers may be added for the same purpose.

In preparing the coating compositions, any solvent dissolving the cyclized rubber-unsaturated carbonyl compound condensation product, may be used, although hydrocarbon solvents, particularly aromatics such as benzene, toluene and xylene, are preferred. Mixed solvents such as those containing minor proportions of ketones, esters, or alcohols, may be used. These compositions may be applied as melts at high temperatures, in which case no solvent, or only a minor proportion of solvent, need be present.

The new cyclized rubber-unsaturated carbonyl compound reaction products are especially useful in coating compositions applied to transparent, smooth, substantially non-porous, non-fibrous sheet, such as those composed of cellulosic material, for example, regenerated cellulose and cellulose acetate, albuminous material, for example, gelatin and casein, and polyvinyl compounds, for example, polyvinyl alcohols and polyvinyl acetals. Water sensitive sheet obtained by coagulation or precipitation and/or regeneration from aqueous (or aqueous alkaline, for example, alkali metal hydroxide and the like) dispersions (or solutions), for example, viscose, cuprammonium and like regenerated cellulose, polyvinyl alcohol, low (lowly) substituted (less than one mol per glucose unit) cellulose ethers (U. S. A. Patent No. 2,123,880 to Ellsworth), such as glycol cellulose, cellulose glycolic acid, alkyl (methyl, ethyl, etc.) cellulose, and the like, are especially satisfactorily coated with the moistureproofing compositions of this invention. As indicated above, the presence of the new cyclized rubber derivatives also improves coating compositions used on organic solvent soluble compounds like cellulose ethers, for example, ethyl cellulose, and cellulose esters, for example, cellulose acetate. The same is true with paper, modified paper, lowly esterified cellulose, etc. The new compounds can also be used to coat fabrics, to prepare molding materials, to act as cementing (binding) agents in protective coatings for wood, metal, etc., as adhesives, and for numerous other purposes. These derivatives also serve admirably as adhesives in the lamination of sheet material, for example, regenerated cellulose, cellulose derivatives of the same or different kinds, regenerated cellulose to paper, etc., especially when a moistureproof product is desired.

Ordinary moistureproof sheet wrapping material consists of a regenerated cellulose film 0.00088 of an inch thick, with a moistureproofing coating 0.0005 of an inch thick on each side.

The reaction products of cyclized rubber with unsaturated hydrocarbon acids and their anhydrides may be further reacted with alcohols, either monohydric or polyhydric, to produce softer or firmer plastic material. Optionally, an ester, such as monobutyl maleate, may be reacted directly. These esterified products, like the non-esterified products, are useful for molding purposes, in adhesives, in protective coatings, etc.

By the expression "anchor" or equivalents (anchoring, anchored, etc.) is meant the securing of the surface coating on the base in such a way that the resulting product will withstand the deleterious effects of water (or moisture). Whether a substance is an anchoring agent or not is easily determined, for example, by comparing the time of immersion in water required to loosen a moistureproofing coating containing the substance, with the time required to bring about the same loosening with the coating omitting the substance being tested (but otherwise having the same proportions of ingredients). Compositions of this invention will adhere to the base sheet for one day, as compared with one hour for the same compositions employing heretofore known cementing agents, when tested by immersion in water at 20° C. This is a 24-fold improvement in the time required to loosen the coating from the water sensitive and non-moistureproof base sheet when it is in direct contact with water.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

Heat seal bond and heat seal bond strength are defined and a standard test for their determination is given in U. S. A. Patent No. 2,147,180 (Ubben). In the interest of brevity the definitions and test description are not repeated here. The terms and expressions related thereto and employed herein are used in accordance with such definitions and description.

The cyclized rubber-carbonyl compound derivatives are extremely stable, thereby making it possible to produce moistureproofed products which retain their desirable properties over a much greater period of time than has been thought possible heretofore. This is particularly true with regard to such characteristics as hardness, adhesion of the coating to the base sheet, strength of adhesive bonds obtained by the application of heat and/or pressure, transparency, and general optical characteristics, absence of color, insensibility to water and moisture, lack of tackiness, etc. As a result, the moistureproof sheet wrapping material described above is well adapted to be handled readily upon automatic wrapping machinery, because the individual sheets do not stick to each other or the machine surfaces with which they come in contact, and for the wrapping of wet products such as butter, fish etc., even when exposed to light, heat, oxygen of the atmosphere, etc.

As many apparently widely different embodiments of this invention may be made without departing from the spirit and scope thereof, it is to be understood that this invention is not limited to the specific embodiments thereof except as defined in the appended claims.

I claim:

1. A condensation product consisting of cyclized rubber reacted with maleic anhydride.

2. A condensation product consisting of cyclized rubber reacted with a carbonyl compound from the group consisting of acrylic acid, crotonic acid, methacrylic acid, cinnamic acid, maleic acid, itaconic acid, maleic acid anhydride, citraconic acid anhydride and citric acid.

3. Sheet material coated with a condensation product consisting of cyclized rubber reacted with a carbonyl compound from the group consisting of acrylic acid, crotonic acid, methacrylic acid, cinnamic acid, maleic acid, itaconic acid, maleic acid anhydride, citraconic acid anhydride and citric acid.

4. Regenerated cellulose coated with a condensation product consisting of cyclized rubber reacted with a carbonyl compound from the group consisting of acrylic acid, crotonic acid, methacrylic acid, cinnamic acid, maleic acid, itaconic acid, maleic acid anhydride, citraconic acid anhydride and citric acid.

5. A moistureproofing coating composition comprising essentially 3%–15% wax and a condensation product consisting of cyclized rubber reacted with maleic anhydride.

6. Regenerated cellulose coated with a moisture-resistant coating composition comprising essentially 3%–15% wax and a condensation product consisting of cyclized rubber reacted with a carbonyl compound from the group consisting of acrylic acid, crotonic acid, methacrylic acid, cinnamic acid, maleic acid, itaconic acid, maleic acid anhydride, citraconic acid anhydride and citric acid.

7. Sheet material coated with a condensation product consisting of carbonyl compound from the group consisting of acrylic acid, crotonic acid, methacrylic acid, cinnamic acid, maleic acid, itaconic acid, maleic acid anhydride, citraconic acid anhydride and citric acid reacted with cyclized rubber obtained by reacting rubber with an amphoteric metal halide.

8. Regenerated cellulose coated with a condensation product consisting of carbonyl compound from the group consisting of acrylic acid, crotonic acid, methacrylic acid, cinnamic acid, maleic acid, itaconic acid, maleic acid anhydride, citraconic acid anhydride and citric acid reacted with cyclized rubber obtained by reacting rubber with an amphoteric metal halide.

9. A thin, flexible, sheet material comprising a film of a moistureproof composition, said moistureproof composition comprising essentially 3%–15% wax and cementing material therefor, said cementing material being a condensation product consisting of cyclized rubber reacted with a carbonyl compound from the group consisting of acrylic acid, maleic acid, itaconic acid, maleic acid anhydride, citraconic acid anhydride and citric acid.

JAMES A. MITCHELL.